(12) United States Patent
Richburg et al.

(10) Patent No.: US 6,957,132 B1
(45) Date of Patent: *Oct. 18, 2005

(54) METHOD OF GUIDING A VEHICLE TO A POSITION

(75) Inventors: Chris Richburg, Panama City, FL (US); Donald D. Hobden, Lynn Haven, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/609,901

(22) Filed: Jun. 26, 2003

(51) Int. Cl.[7] .......................... G01C 22/00; G05D 1/00; F21V 29/00
(52) U.S. Cl. .......................... 701/23; 701/24; 362/543; 362/544; 362/545
(58) Field of Search .................... 701/23–28, 200–201, 701/207–211, 223, 300–302; 362/520–522, 362/238, 240, 512, 11, 36–37, 41, 43, 509–511, 362/543–545; 340/942, 958; 250/330–334, 250/206–206.3, 226, 229, 578.1, 234–236, 250/559.1; 180/167–169; 348/113, 118, 119, 348/750–751

(56) References Cited

U.S. PATENT DOCUMENTS

| | | | |
|---|---|---|---|
| 4,626,995 A * | 12/1986 | Lofgren et al. ................ | 701/24 |
| 4,653,002 A * | 3/1987 | Barry .......................... | 701/23 |
| 4,773,018 A * | 9/1988 | Lundstrom .................. | 701/200 |
| 4,786,167 A * | 11/1988 | Rothbone et al. ........ | 356/141.5 |
| 5,162,643 A * | 11/1992 | Currie ...................... | 250/206.1 |
| 5,291,195 A * | 3/1994 | Gross ......................... | 340/958 |
| 6,530,683 B1 * | 3/2003 | Ohkohdo et al. ........... | 362/511 |
| 6,728,464 B1 * | 4/2004 | Waldmann .................. | 385/147 |
| 2003/0133291 A1 * | 7/2003 | Williams et al. ............ | 362/231 |
| 2004/0094717 A1 * | 5/2004 | Griffin et al. ............... | 250/349 |

* cited by examiner

Primary Examiner—Jacques H. Louis-Jacques
(74) Attorney, Agent, or Firm—James T. Shepherd

(57) ABSTRACT

A method of guiding a vehicle to a position is provided. Light sources arranged in an array are placed at a position with the light sources defining a primary field-of-view (FOV) from which all of the light sources are visible. Less than all of the light sources are visible from positions outside of the primary FOV. The light sources are divided into sections with each section having a portion of the light sources associated therewith. The light sources are operated in accordance with cyclical on/off sequences so that a primary waveform of light energy is defined by the cyclical on/off sequence visible from within the primary FOV and secondary waveforms of light energy are defined by the cyclical on/off sequences visible from positions outside of the primary FOV. The light energy generated by the light sources is sensed by an approaching navigable vehicle. Based on the position of the vehicle, one of the primary waveform and the plurality of secondary waveforms is sensed. A database on the vehicle stores calibration waveforms indicative of guidance correction signals that can be used to control navigation of the vehicle. The calibration waveform that is closest to the primary and secondary waveforms so-sensed is indicative of the guidance correction signal.

10 Claims, 4 Drawing Sheets

METHOD OF GUIDING A VEHICLE TO A POSITION

ORIGIN OF THE INVENTION

The invention described herein was made in the performance of official duties by employees of the Department of the Navy and may be manufactured, used, licensed by or for the Government for any governmental purpose without payment of any royalties thereon.

CROSS-REFERENCE TO RELATED PATENT APPLICATIONS

This patent application is co-pending with two related patent applications entitled "SYSTEM FOR GUIDING A VEHICLE TO A POSITION" (Ser. No. 10/609,902 filed Jun. 26, 2003) and "LIGHT SYSTEM FOR DEFINING LINE OF APPROACH" (Ser. No. 10/608,118 filed Jun. 26, 2003), filed by the same inventors and on the same date as this patent application.

FIELD OF THE INVENTION

The invention relates generally to optical guidance methods, and more particularly to a method that generates light waveforms as a means to provide guidance to an approaching vehicle.

BACKGROUND OF THE INVENTION

Prior art systems that guide a manned or unmanned vehicle on an approach to a particular position are varied in the techniques, apparatus and complexity. For example, in terms of underwater guidance, autonomous docking of unmanned underwater vehicles (UUVs) requires a higher degree of accuracy than is available using standard UUV navigation equipment such as an Inertial Navigation Unit (INU) or the Global Positioning System (GPS). Although UUVs have been autonomously docked by augmenting INU and GPS data with acoustical homing, such systems still lack precision and have required the use of large docking cones to perform the final close-range alignment and docking of the vehicle. The large size and weight of the docking cones make them impractical to carry onboard a UUV.

A United States Office of Naval Research paper entitled "Underwater Docking of Autonomous Undersea Vehicles Using Optical Terminal Guidance," by Cowen et al, IEEE Oceans '97, Halifax, NS, October 1997, describes a system that uses a single light source to guide a UUV to a docking station. Although it provides a good degree of accuracy, this system only aligns the UUV with the light's position and does not provide any guidance corrections to achieve a preferred line of approach.

SUMMARY OF THE INVENTION

Accordingly, it is an object of the present invention to provide a method that can be used to guide a vehicle to a position.

Another object of the present invention to provide a method that produces an optical signal such that an approaching vehicle sensing the optical signal is provided with guidance correction information based on the vehicle's viewing position relative to the source of the optical signal.

Other objects and advantages of the present invention will become more obvious hereinafter in the specification and drawings.

In accordance with the present invention, a method of guiding a vehicle to a position is provided. Light sources arranged in an array are placed at a position with the light sources defining a primary field-of-view (FOV) from which all of the light sources are visible. Less than all of the light sources are visible from positions outside of the primary FOV. The light sources are divided into sections with each section having a portion of the light sources associated therewith. The light sources are operated in accordance with cyclical on/off sequences. Each cyclical on/off sequence is (i) associated with a corresponding one of the sections, (ii) identical for the portion of light sources associated with the corresponding one of the sections, and (iii) unique for each section. A primary waveform of light energy is defined by the cyclical on/off sequence visible from within the primary FOV. A plurality of secondary waveforms of light energy are defined by the cyclical on/off sequences visible from positions outside of the primary FOV. The light energy generated by the light sources is sensed by an approaching navigable vehicle according to those of the light sources visible to the vehicle. As a result, based on the position of the vehicle, one of the primary waveform and the plurality of secondary waveforms is sensed. A database on the vehicle stores a plurality of calibration waveforms wherein each calibration waveform is indicative of a guidance correction signal that can be used to control navigation of the vehicle. The calibration waveform that is closest to the primary and secondary waveforms so-sensed is indicative of the guidance correction signal needed to control navigation of the vehicle.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
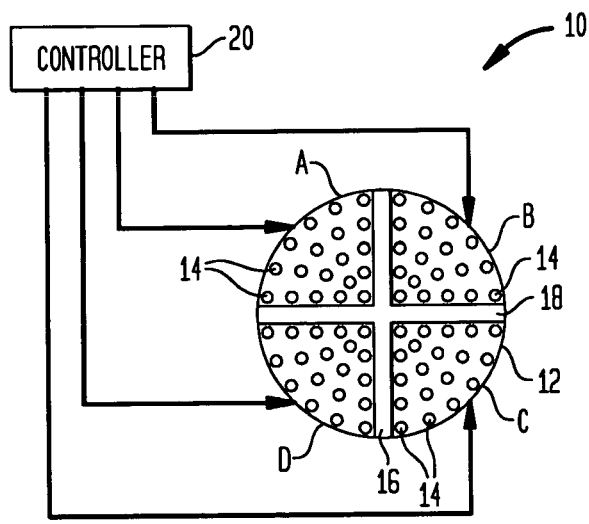
FIG. 1 is a head-on plan view of one embodiment of a light transmitter used to define a line of approach in accordance with the present invention.
Figure 2:
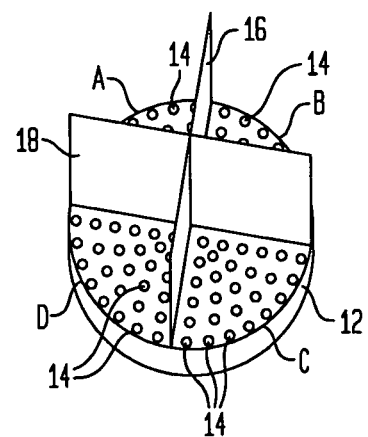
FIG. 2 is a perspective view of the emitter portion of the light transmitter in FIG. 1 as it would appear if it were being approached from underneath and to the right thereof.

Referring now to the drawings, simultaneous reference will be made to FIGS. 1 and 2 where one embodiment of a light transmitter that can define a line of approach thereto in accordance with the present invention is shown and referenced generally by numeral 10. Light transmitter 10 can function on its own or as part of an alignment or docking system as will be explained further below. While it is to be understood that light transmitter 10 can be used in any air, space, underwater or on land environment, the present description thereof will assume use in an underwater environment by way of illustrative example.

Light transmitter 10 has a light emitter portion defined by a frame 12 supporting and defining locations for a plurality of light sources 14 forming an array. Each of light sources 14 can be any one of a variety of light sources to include a light emitting diode or LED such as "super bright" LEDs for turbid environments, laser lights, lights with filters, etc. Accordingly, it is to be understood that the light source type is not a limitation of the present invention. Although a circular array of light sources 14 is shown, it is to be understood that the particular geometric shape of the array is not a limitation of the present invention. In the illustrated embodiment, frame 12 positions light sources 14 to form a two-dimensional or planar array. However, as will be explained further below, the array could also be three-dimensional.

Light sources 14 are divided into sections that extend out to the periphery of the array. In the illustrated embodiment, the sections are created by use of walls that extend outward from frame 12. For example, in the illustrated embodiment, perpendicularly-arranged walls 16 and 18 divide light sources 14 into four quadrants A, B, C and D. To enhance light energy emanating from any one of the quadrants, the surfaces of walls 16 and 18 can be reflective. It is to be understood that the number of such walls and resulting sections of light sources is not a limitation of the present invention. For example, the four-quadrant example is useful in environments such as water, air or space where an approaching vehicle can be above, below, right or left of light transmitter 10. However, in an "on the ground" environment, it may be sufficient to divide the light sources into just two sections such as right and left.

Regardless of the number of sections created by the use of such walls, a viewer positioned to see a head on view of light transmitter 10 (i.e., the view shown in FIG. 1) will see all of light sources 14. Thus, with light sources 14 turned on, the field-of-view defined by the visibility of all of light sources 14 serves as identification of the preferred line of approach to an oncoming viewer (e.g., vehicle). However, just identifying the preferred line of approach does not necessarily provide information as to how one gets on the preferred line of approach. This problem is exacerbated when operating in a turbid medium. Accordingly, light transmitter 10 includes a controller 20 for individually controlling each section of light sources 14 so that a composite (light energy) waveform is generated by those of light sources 14 visible to a viewer from the viewer's location. The characteristics or shape of the composite waveform are dictated by the viewing position.

Figure 3:
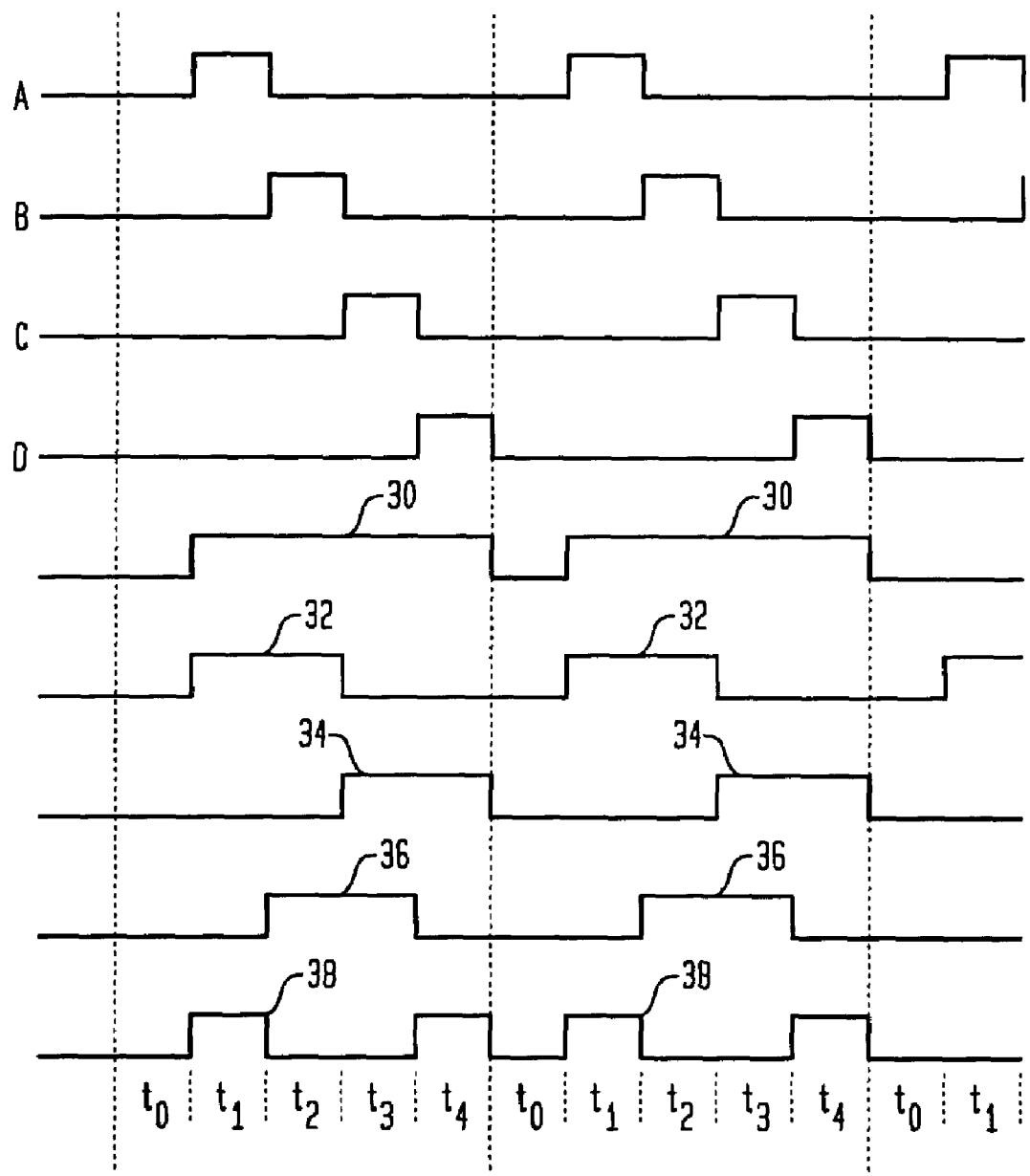
FIG. 3 depicts timing diagrams of the cyclical on/off sequences and resulting waveforms seen from a variety of approach positions in accordance with a phase shifted embodiment of the present invention.

To provide a viewer with a unique waveform based on viewing position (relative to light transmitter 10), controller 20 causes light sources 14 in each of sections A, B, C and D to flash on and off in accordance with a unique cyclical timing sequence. While a variety of on/off sequences can be used, two such schemes will be described herein by way of non-limiting examples. In FIG. 3, a time-phase scheme is illustrated where the ON pulse for each of sections A, B, C and D has the same duty cycle (i.e., duration of time on versus total time of one cycle), but is shifted in phase by one time period for each successive section. The resulting composite waveform generated at each cycle is dependent on the viewer's position relative to light transmitter 10. For example, composite waveform 30 is visible from a position in the field-of-view of all light sources 14, i.e., along the preferred line of approach. Composite waveform 32 is visible from a position above light transmitter 10 (i.e., light sources 14 in sections C and D are substantially or completely blocked). Composite waveform 34 is visible from a position below light transmitter 10 (i.e., light sources 14 in sections A and B are substantially or completely blocked). Composite waveform 36 is visible from a position to the right of light transmitter 10 (i.e., light sources 14 in sections A and D are substantially or completely blocked). Composite waveform 38 is visible from a position to the left of light transmitter 10 (i.e., light sources 14 in sections B and C are substantially or completely blocked). Note that other unique composite waveforms (not shown) are viewed when only one of the sections is substantially or completely blocked as would be the case from positions that are (i) above and left, (ii) above and right, (iii) below and left, and (iv) below and right of light transmitter 10. Thus, the composite waveform that is sensed is indicative of the viewer's position relative to the preferred line of approach. Accordingly, as will be explained further below, the composite waveform can also be indicative of what type of navigation correction is required to achieve the preferred line of approach from the viewing position.

Figure 4:
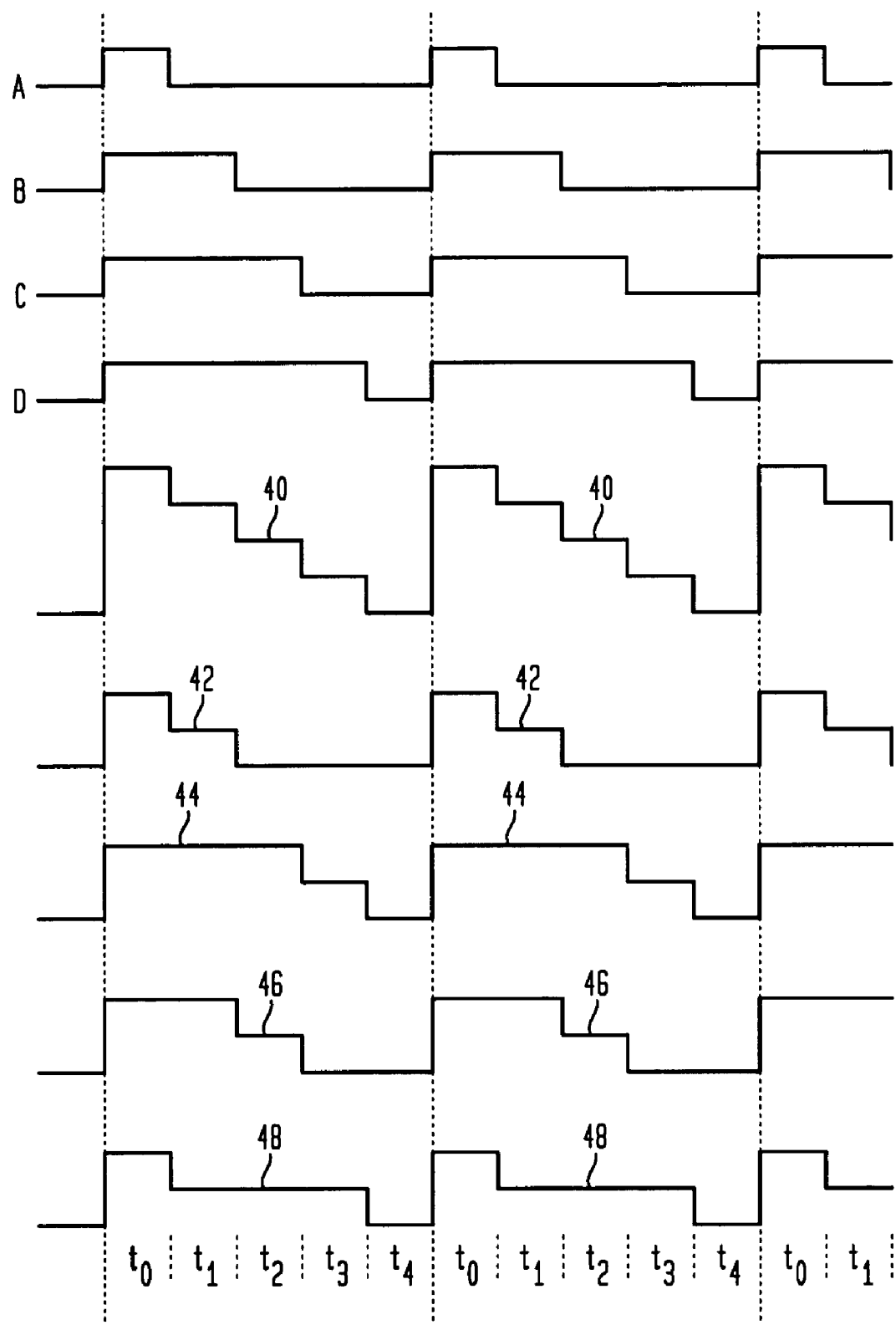
FIG. 4 depicts timing diagram of the cyclical on/off sequences and resulting waveforms seen from a variety of approach positions in accordance with a relative intensity embodiment of the present invention.

A second, light intensity approach to the cyclical on/off sequencing applied to light sources 14 is depicted in FIG. 4 where the ON pulse for each of sections A, B, C and D is unique in terms of its duration. In this approach, the resulting composite waveform generated at each cycle yields a composite intensity waveform dependent upon the viewer's position. More specifically, in the light intensity approach, when more than one of sections (e.g., sections A, B, C and D) is visible from a particular viewer's position, the light intensity from each section will combine resulting in changes in light intensity between consecutive time periods. This relative change in intensity between consecutive time periods can be used to identify from which of the sections (of light sources) that the light originated. For example, composite waveform 40 is visible from a position in the field-of-view of all light sources 14, i.e., along the preferred line of approach. Composite waveform 42 is visible from a position above light transmitter 10 (i.e., light sources 14 in sections C and D are substantially or completely blocked). Composite waveform 44 is visible from a position below light transmitter 10 (i.e., light sources 14 in sections A and B are substantially or completely blocked). Composite waveform 46 is visible from a position to the right of light transmitter 10 (i.e., light sources 14 in sections A and D are substantially or completely blocked). Composite waveform 48 is visible from a position to the left of light transmitter 10 (i.e., light sources 14 in sections B and C are substantially or completely blocked). Similar to the FIG. 3 waveforms, other unique composite waveforms (not shown) are viewed when only one of the sections is substantially or completely blocked as would the case from positions that are (i) above and left, (ii) above and right, (iii) below and left, and (iv) below and right of light transmitter 10. Thus, once again, the composite waveform that is sensed is indicative of the viewer's position relative to the preferred line of approach.

Figure 5:
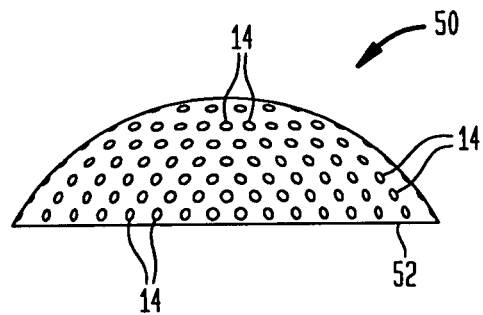
FIG. 5 is a side view of a dome-shaped array of light sources.
Figure 6:
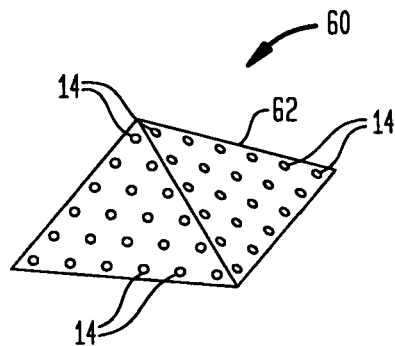
FIG. 6 is a perspective view of a pyramid-shaped array of light sources.

In the above-described embodiment, frame 12 holds light sources 14 in a two-dimensional planar array while walls 16 and 18 are used to define sections of light sources 14. However, the present invention is not so limited. For example, walls 16 and 18 could be eliminated if the frame supporting light sources 14 created a three-dimensional array of light sources where the three-dimensional nature of the array divides the light sources into sections by virtue of a viewer's position relative thereto. Accordingly, FIG. 5 depicts a dome-shaped array 50 of light sources 14 where a frame 52 defines a dome shape that supports light sources 14. In another example, FIG. 6 depicts a pyramid-shaped array 60 of light sources 14 where a frame 62 defines a pyramid shape that supports light sources 14. Note that a three-dimensional array of light sources could also employ walls (analogous to walls 16 and 18 in FIG. 1) extending therefrom to further define sections of the light sources.

As described above, the preferred line of approach is defined by the head on or primary field-of-view from which all of light sources 14 are visible. If it becomes necessary to reduce the cross-sectional area of this primary field-of-view, controller 20 simply excludes peripherally located ones of light sources 14 from the on/off sequence. Further, as will be explained further below, reduction in cross-sectional area of the primary field-of-view can be correlated to the proximity of an approaching viewer (e.g., vehicle). That is, cross-sectional area can be reduced as a vehicle draws nearer to light transmitter 10.

It is preferred that each of light sources 14 produces light energy having the same wavelength in order to simplify reception and interpretation of the composite waveforms generated by the array of light sources. In terms of operating in an underwater environment, the wavelength of light source operation could range from approximately 390 nanometers (i.e., the violet and indigo region of the color spectrum) up to approximately 577 nanometers (i.e., through the blue and green regions of the color spectrum) with longer transmissions distances being achieved with the shorter wavelengths.

Figure 7:
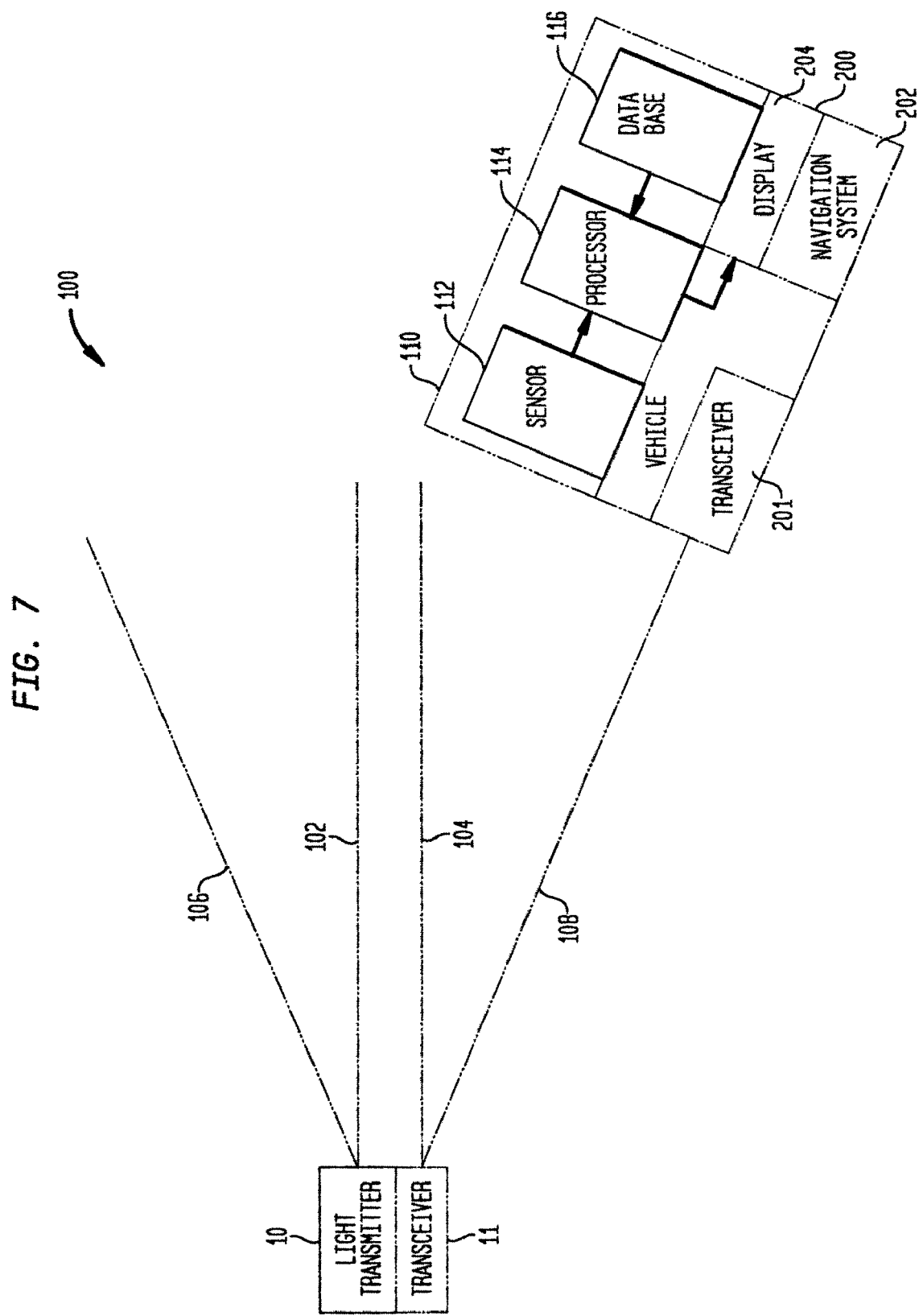
FIG. 7 is a side schematic view of a system incorporating the light transmitter that provides guidance to a vehicle approaching the light transmitter.

Referring now to FIG. 7, light transmitter 10 can be incorporated into a system 100 that provides guidance to a vehicle approaching light transmitter 10. Accordingly, light transmitter 10 is well suited to be incorporated into a vehicle alignment and/or docking system. In FIG. 7, the head on or primary field-of-view (FOV) defined by light transmitter 10 lies between dashed lines 102 and 104. A plurality of secondary FOVs are defined at positions outside of primary FOV 102/104 with each such secondary FOV being indicative of a different composite waveform that would be visible to a viewer therein. For example, in the side view illustrated, different composite waveforms would be visible to a viewer between dashed lines 102 and 106 and between dashed lines 104 and 108. The uniqueness of the various composite waveforms can be used to provide guidance control.

System 100 includes a receiver 110 placed in or on a vehicle 200 which is shown in phantom to indicate that vehicle 200 is not part of the present invention. Receiver 110 includes at least one sensor 112 for sensing the light energy transmitted by light transmitter 10. Such sensors are well known in the art and will not be described further herein. The light energy collected over one cycle of a transmission from light transmitter 10 forms a composite waveform as described above. The composite waveform is presented to an onboard processor 114 where it can be, for example, compared with calibration waveforms stored in an onboard database 116. Note that other types of composite waveform processing could also be used to determine a viewer's position.

The calibration waveforms represent all possible composite waveforms that could be viewed by an approaching vehicle. Each calibration waveform has guidance correction information associated therewith. For example, a calibration waveform associated with the head on or primary FOV would have a guidance correction of "zero" (i.e., continue straight) associated therewith. However, a calibration waveform associated with one of the secondary FOVs would have specific guidance correction information (e.g., go up, go down, come left, come right, go up and to the right, etc.) associated therewith. Accordingly, once processor 114 finds the calibration waveform that most closely approximates the sensed composite waveform, the appropriate guidance correction information to bring vehicle 200 onto a course for primary FOV 102/104 is established. The guidance correction information (signal) is passed to vehicle 200 where it can be implemented automatically by a vehicle navigation system 202. Another option is to display the guidance correction information on a vehicle display 204 where a vehicle operator can implement the instruction manually.

In using system 100, light transmitter 10 is placed at a position that vehicle 200 is to be guided towards. For example, light transmitter 10 could be positioned as a stand alone way point or could be located on a fixed or moving structure (not shown) with which vehicle 200 is to rendezvous or dock. Light transmitter 10 could then be operated as described above with receiver 110 monitoring the light energy transmitted in order to generate the composite waveform based on the position of vehicle 200 relative to light transmitter 10. As the range between vehicle 200 and light transmitter 10 decreases, the cross-sectional size of primary FOV 102/104 can be decreased. This forces receiver 110 into a more sensitive mode of operation yielding more precise guidance corrections as vehicle 200 gets closer. As described above, reduction in cross-sectional area of the primary FOV is achieved by excluding the outermost ones of light sources 14 from the on/off sequences. Accordingly, it is advantageous to lay out light sources 14 in concentric rings (as shown in FIGS. 1, 5 and 6) so that an entire outer ring of light sources 14 can be excluded at one time. In this way, the cross-section of primary FOV 102/104 is reduced in a proportional manner with respect to each emitter section of light transmitter 10.

Range of vehicle 200 relative to light transmitter 10 can be communicated to the light transmitter's controller (i.e., controller 20) by means of transceivers 11 and 201 (shown in phantom to indicate that they are optional elements of system 100) mounted on light transmitter 10 and vehicle 200, respectively. With the inclusion of such communication capabilities, the method of the present invention can further be enhanced by providing a number of different operational modes. For example, a search mode of operation could be a default mode entered into upon system activation. In the search mode, light transmitter 10 would flash all of its light sources concurrently at a predetermined rate. Once sensor 112/processor 114 acquires/recognizes the flashing lights, processor 114 could use the predetermined rate of flashing to set its own internal clock. That is, the flash rate can be used to synchronize the internal clock of processor 114 with light transmitter 10. The accomplishment of this task can be communicated to light transmitter 10 using transceivers 11 and 201. At this point, light transmitter 10 could be switched to a tracking mode. Note that communication between light transmitter 10 and vehicle 200 can be accomplished with any known communication techniques to include acoustics and optics. Further, light transmitter 10 could be used to transmit such optical communications.

The tracking mode can be characterized by a number of stages, each of which involves applying a unique cyclical on/off sequence to each section of light sources as described in detail above. The differences between the stages will be dictated by the range between light transmitter 10 and receiver 110. When first entering the tracking mode, it is assumed that there is substantial range between light transmitter 10 and receiver 110 so that all of the light sources are included in the on/off sequencing control of light transmitter 10. As range decreases, outer rings of the light sources can be excluded from the on/off sequencing in order to reduce the cross-sectional area of the light transmitter's primary FOV. Such reduction in cross-sectional area of the primary FOV can occur one or more times during the tracking mode.

The advantages of the present invention are numerous. Alignment and positioning of vehicles is improved over current and previous systems. The separate emitter sections of the present invention provide angular as well as positional alignment of vehicles. This is critical in a sensitive docking procedure.

The present invention is simple in design and requires relatively little computing power. The light transmitter is a stand-alone component requiring only electrical power to feed its light array and internal timing circuitry, and does not task its host with any additional computer processing requirements. The receiver is a compact system consisting of relatively simple hardware connected with a processing and control card. The simplicity and small size of the system reduces the overall impact to the host vehicles or structures to which they are attached.

The receiver will see the light transmitter as a small light source, and will not use the dimensions of the emitter for guidance. Therefore, if high power LEDs are used, the array of light sources can be very small in size. In addition, the receiver is designed around a simple light diode photo-detector and will have only minimal computing requirements which could be fulfilled using an existing computer system of the receiver's host vehicle. Therefore, small size and minimal computer-tasking requirements make the present system ideal for small as well as for larger vehicles.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of guiding a vehicle to a position, comprising the steps of:
    placing light sources arranged in an array at a position with said light sources defining a primary field-of-view (FOV) from which all of said light sources are visible wherein less than all of said light sources are visible from positions outside of said primary FOV, said light sources being divided into a plurality of sections with each of said plurality of sections having a portion of said light sources associated therewith;
    operating said light sources in accordance with a plurality of modes to include a search mode and a tracking mode, wherein said search mode is defined by all of said light sources flashing on and off concurrently at a predetermined rate, and wherein said tracking mode is defined by said light sources being operated in accordance with cyclical on/off sequences, each of said cyclical on/off sequences being (i) associated with a corresponding one of said plurality of sections, (ii) identical for said portion of said light sources associated with said corresponding one of said plurality of sections, and (iii) unique for each of said plurality of sections, wherein a primary waveform of light energy is defined by said cyclical on/off sequences associated with said plurality of sections and visible from within said primary FOV, and wherein a plurality of secondary waveforms of light energy are defined by said cyclical on/off sequences visible from positions outside of said primary FOV;
    providing a receiver on a vehicle traveling towards said position, said receiver including at least one light sensor, a database, and a processor having an internal clock;
    sensing, using said at least one light sensor, light energy generated by ones of said light sources visible thereto;
    utilizing, when said light sources are operating in said search mode, said predetermined rate to set timing for said internal clock;
    providing a plurality of calibration waveforms in said database, wherein each of said calibration waveforms is indicative of a guidance correction signal that can be used to control navigation of the vehicle; and
    determining, using said processor when said light sources are operating in said tracking mode, which one of said calibration waveforms is closest to said one of said primary waveform and said plurality of secondary waveforms so-sensed, wherein said guidance correction signal associated with said one of said calibration waveforms can be used to control navigation of the vehicle.

2. A method according to claim 1 wherein one cycle of each of said cyclical on/off sequences includes a pulse of common duration, and wherein said one cycle associated with each of said plurality of sections is distinguishable by the timing of said pulse within said one cycle.

3. A method according to claim 1 wherein one cycle of each of said cyclical on/off sequences includes a pulse, and wherein said one cycle associated with each of said plurality of sections is distinguishable by the duration of said pulse within said one cycle.

4. A method according to claim 1 wherein each of said plurality of sections includes a portion of a periphery of said array, and wherein said method further comprises the step of excluding ones of said light sources at said periphery from said cyclical on/off sequences to reduce a cross-sectional area of said primary FOV as the vehicle gets closer to said position.

5. A method according to claim 1 wherein each of said light sources produces light energy having the same wavelength.

6. A method according to claim 1 wherein each of said light sources produces light energy having a wavelength in the range of approximately 390 nanometers to approximately 577 nanometers.

7. A method of guiding a vehicle to a position, comprising the steps of:
    placing light sources arranged in an array at a position with said light sources defining a primary field-of-view (FOV) from which all of said light sources are visible wherein less than all of said light sources are visible from positions outside of said primary FOV, each of said light sources producing light energy having the same wavelength when turned on, said light sources being divided into a plurality of sections with each of said plurality of sections having a portion of said light sources associated therewith, said array being defined by concentric rings of said light sources with each of said plurality of sections having a portion of said light sources associated therewith to include portions of each of said concentric rings;

operating said light sources in accordance with a plurality of modes to include a search mode and a tracking mode, wherein said search mode is defined by all of said light sources flashing on and off concurrently at a predetermined rate, and wherein said tracking mode is defined by said light sources being operated in accordance with cyclical on/off sequences, each of said cyclical on/off sequences being (i) associated with a corresponding one of said plurality of sections, (ii) identical for said portion of said light sources associated with said corresponding one of said plurality of sections, and (iii) unique for each of said plurality of sections, wherein a primary waveform of light energy is defined by said cyclical on/off sequences associated with said plurality of sections and visible from within said primary FOV, and wherein a plurality of secondary waveforms of light energy are defined by said cyclical on/off sequences visible from positions outside of said primary FOV;

providing a receiver on a vehicle traveling towards said position, said receiver including at least one light sensor, a database, and a processor having an internal clock;

sensing, using said at least one light sensor, light energy generated by ones of said light sources visible thereto;

utilizing, when said light sources are operating in said search mode, said predetermined rate to set timing for said internal clock;

providing a plurality of calibration waveforms in said database, wherein each of said calibration waveforms is indicative of a guidance correction signal that can be used to control navigation of the vehicle;

determining, using said processor when said light sources are operating in said tracking mode, which one of said calibration waveforms is closest to said one of said primary waveform and said plurality of secondary waveforms so-sensed, wherein said guidance correction signal associated with said one of said calibration waveforms can be used to control navigation of the vehicle; and excluding outermost ones of said concentric rings of said light sources from said cyclical on/off sequences to reduce a cross-sectional area of said FOV as the vehicle gets closer to said position.

8. A method according to claim 7 wherein one cycle of each of said cyclical on/off sequences includes a pulse of common duration, and wherein said one cycle associated with each of said plurality of sections is distinguishable by the timing of said pulse within said one cycle.

9. A method according to claim 7 wherein one cycle of each of said cyclical on/off sequences includes a pulse, and wherein said one cycle associated with each of said plurality of sections is distinguishable by the duration of said pulse within said one cycle.

10. A method according to claim 7 wherein each of said light sources produces light energy having a wavelength in the range of approximately 390 nanometers to approximately 577 nanometers.

* * * * *